United States Patent Office 3,230,827
Patented Jan. 25, 1966

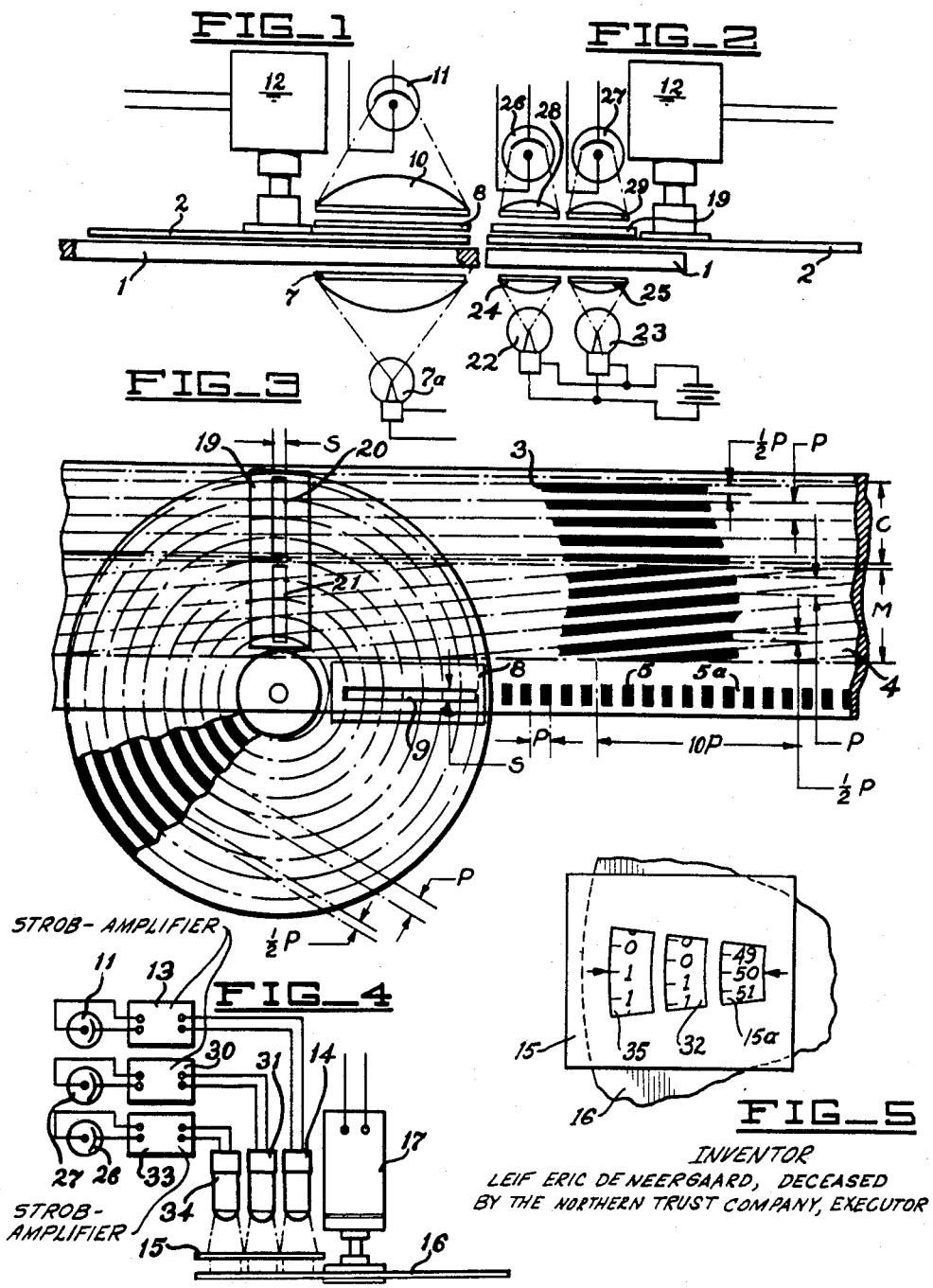

3,230,827
LIGHT FLUX INTERRUPTING SYSTEM FOR MEASURING DISPLACEMENTS
Leif Eric de Neergaard, deceased, late of Madison, Wis., by the Northern Trust Company, executor, Chicago, Ill., assignor to Frederic W. Olmstead, Washington, D.C., Hans W. Trechsel, Madison, Wis., Deryck A. Gerard, Minneapolis, Minn., and Norman S. Parker, Evanston, Ill., trustees
Original application Apr. 7, 1958, Ser. No. 726,998, now Patent No. 3,076,374, dated Feb. 5, 1963. Divided and this application May 9, 1962, Ser. No. 201,226
1 Claim. (Cl. 88—61)

This application is a division of application Serial No. 726,998, filed April 7, 1958, now Patent 3,076,374. Application Serial No. 726,998 is a continuation in part of application Serial No. 137,159, filed January 6, 1950, now forfeited, and application Serial No. 527,719, filed August 11, 1955, now abandoned.

This invention relates to measuring apparatus, and is more particularly illustrated in connection with apparatus for measuring linear displacements such as the length, width, thickness, depth, diameter and similar measurements of articles of manufacture as they are being machined, fabricated or inspected.

A lead-screw with a highly accurate thread generated along its length, operating in conjunction with precision machined coacting nut, is frequently used in machine tools such as lathes, grinders, milling machines and similar fabricating machines to simultaneously control and measure the displacements of work-to-tool or tool-to-work members while an article of manufacture is being processed. Smaller screws also with coacting nuts are also used as the basic measuring elements in the well known micrometer extensively used in gauging dimensions of work either in process or in final inspection. Since the internal thread of the nut is in actual physical contact with the thread of the lead-screw, it is apparent that this metal to metal contact will induce friction and therefore wear between these elements, and since the accuracy of a lead-screw and its coacting nut is dependent upon the integrity of their dimensions, it is apparent that, due to this wear, their value in accurately measuring linear displacements or dimensions diminishes as these elements are used. This wear is most pronounced in situations where rotation of the lead screw is not only used for measuring linear displacements but also as the means for advancing tool-to-work or work-to-tool members. Thus, a lead-screw controlling the movement of the slide of a lathe for example loses its high degree of accuracy in a short time due to wear of the lead-screw and coacting nut caused by the resistance of the cutting tool as it is forced into the stock being machined.

Scales equipped with vernier attachments are also commonly used in measuring linear displacements of carriages, slides, and similar tool-to-work or work-to-tool members of machine tools, as well as in bench inspection. Such measuring devices entail the use of considerable skill in making accurate readings even when a high powered magnifying glass is used, and cannot, as a rule, be read with accuracies of greater than plus or minus one or two ten-thousandths of an inch, and inasmuch as the human element is a great factor in making close vernier readings, it is often possible for two skilled machinists to identify the same reading differently.

Dial gauges are frequently used in inspection work to measure very small linear displacements, although their total range of operation is generally in the order of but one or two hundredths of an inch. Such a gauge uses a delicate mechanism to mechanically magnify movement between the gauge button and the indicating pointer. These gauges soon lose their accuracy, while rough handling or an accidental blow will often completely destroy their utility.

Sets of gauge blocks of various lengths, made of specially selected and aged steel, and finished to such close tolerances as two or three millionths of an inch in the dimension between their parallel faces, are extensively used in tool rooms for inspection and layout work requiring high limits of accuracy. In use, blocks of various known lengths are stacked or "wrung" together until the overall length of the stack equals the desired measurement. These gauge blocks although highly accurate under certain conditions of use are extremely expensive. Not only does this factor limit their use in ordinary inspection and layout, but the excessive time used in selecting the proper gauge blocks and "wringing" them together makes their use for many operations entirely impractical.

Another shortcoming of gauge blocks is that after use for a considerable length of time the blocks wear due to rubbing action when they are "wrung" together with an attendant reduction in their accuracies.

An important object of this invention is an apparatus for making linear measurements in which there is absolutely no physical contact between the measuring elements. Thus, the accuracy of the device is absolutely unimpaired with use.

Another important object is a measuring apparatus whose visual indicating means can be remotely located from the point where the measurement is being made. Thus, the indicating means can be placed at any desired location on a machine tool where it can be most efficiently read by the operator.

Yet another important object is methods and means by whose use measuring apparatus can be constructed which is capable of instantaneously and continuously indicating linear displacements within the range of the device in units, tenths, hundredths, thousandths and ten thousandths of an inch any linear displacement of a lathe carriage along the length of a lathe bed which, in some instances, may measure hundreds of inches in length.

Another important object obtained by the use of the methods and means comprising this invention consists of a system of linear measurement in which a very small measured displacement can be magnified at the visual indicating means by a factor of 1,000, 10,000, or even more if desired. Thus, a measured linear displacement of .0001 inch, for example, can cause the indicating means to move through a distance of one inch or more, depending on the magnification factor used in the design of a specific measuring apparatus. This great magnification allows large and well spaced numerical characters to be printed or etched on the dials of the indicator. It is obvious that large characters make for extreme ease in reading, thus reducing operator fatigue, and chances of errors, to a minimum.

Another object is to provide greater dimensional stability to a measuring system.

Another object is a mechanism which may present a reading of a distance being measured in terms of inches and fractions of inches.

Other objects will appear from time to time in the ensuing specification and drawings, in which:

FIGURE 1 is an elevation view of one embodiment of the invention;

FIGURE 2 is a side elevation of the embodiment shown in FIGURE 1;

FIGURE 3 is a plan view of the embodiment shown in FIGURES 1 and 2;

FIGURE 4 is a diagrammatic illustration of an indicating system employed with the embodiment of FIGURES 1 through 3; and FIGURE 5 is a detail view of an indicating instrument employed with FIGURE 4;

The drawings illustrate a system adapted to continuously measure and visually indicate any linear displacements within the range of the system.

Referring specifically now to FIGURE 1, a first measuring element 1 is illustrated which takes the form of an elongated and lineally extending transparent member. It may take the form of an elongated glass bar. A second measuring element is formed by a scanning disc 2 which is positioned closely adjacent to the surface of the elongated meter bar or member 1 but is spaced a slight distance therefrom which will be apparent in FIGURES 1 and 2. The meter bar 1 has a first series of elongated and generally parallel flux conductive areas thereon represented generaly at 3 defining a channel C, a second series of flux conductive elements 4 defining a channel M, and a third series of flux conductive elements 5. It should be noted that the first series of flux conductive elements 3 have a slight slope with respect to the edge of the meter bar, the second series has a greater slope than the first and that the third series 5 is formed of transversely extending elements which are spaced along the length of the meter bar.

According to the principles of the invention, these flux conductive areas in the embodiment illustrated in FIGURES 1, 2 and 3 are formed by alternate opaque and transparent areas on the meter bar so that light may be projected through the transparent areas. In this embodiment of the invention the pitch of these areas or the distance from the center line of one area to the center line of an adjacent similar area is equal in each of the series 3, 4 and 5 and each area has a width equal to one-half the pitch "P." The pitch may be taken to be a pre-determined unit of linear measurement such as for example, 1/10 of an inch, so that in the series 5 there are ten similar areas per inch. According to the principles of the invention, the scanning member 2 has alternate opaque and transparent sections thereon formed by the convolutions of an opaque spiral extending around the axis of the scanner 2. The transparent convolutions form another series of light flux transmissive areas opposed to the series on the meter bar. The pitch "P" of the convolutions is equal to the pitch "P" of the opaque areas on the meter bar or meter ribbon and the width of these areas is equal to the width of the areas on the meter bar or ½ "P."

A light source 7a is positioned beneath the series 5 and projects light through a lens 7 and through a plurality of the transparent or light flux conductive areas 5a in the series 5. This light passes through the transparent convolutions of the spiral formed on the scanner and through a light shield 8 which has a slot 9 extending over a plurality of the light transmissive areas in the series 5 and along the length of the series. The light passing through the series 5 and through the transparent areas of the scanner 2 and slot 9 is received by a lens 10 and focused on a photocell 11. Thus it will be seen that the amount of light received by the photocell and the resulting current transmitted by the photocell will be dependent on the relative position of the convolutions of the spiral on the scanner 2 and the areas in the series 5.

According to the invention, the scanner 2 is driven by a synchronous motor 12 at a predetermined speed, say for example, 60 revolutions per second. If the scanner 2 is rotated in a counterclockwise direction in FIGURE 3 the convolutions of the spiral at that position over the slot 9 will appear to move from right to left at the rate of 60 pitches per second. This has the effect of alterately increasing and diminishing the amount of light flux passing through the areas of the spiral at the scanning rate or 60 times per second. Thus the photocell will transmit a signal having a frequency corresponding to the scanning rate or 60 cycles per second.

If the meter bar 1 and the scanner 2 are moved bodily relative to one another in a direction parallel to the length of the bar 1 while the scanning action is taking place, a frequency shift in the signal results. For example, if the member 1 is moved to the left a distance equal to one pitch during one second of time, the resultant instantaneous frequency will be 59 cycles per second. If the member 1 is moved to the right, the resultant instantaneous frequency will be 61 cycles per second. In other words, relative movement equal to one pitch of 1/10 of an inch is equal to a 360 degree phase change in the signal generated.

It should be understood that the relative movement need not occur in any given period of time. It may take place gradually or quickly. The relative movement has been mentioned as occurring in one second of time for purposes of description. Furthermore, any relative displacement less than that stated or less than 1/10 of an inch brings about a proportionally smaller phase change in the signal generated. The signal transmitted by the photocell 11 is amplified and translated to a pulse amplifier as at 13 and is supplied to a stroboscopic light source 14. The light source 14 is employed to illuminate through a shield 15 a portion 15a of an indicating disc 16 which is rotated by a synchronous motor 17. The synchronous motor 17 is supplied with current from the same source as supplys the motor 12 so that the disc 16 is driven at the same rotational speed as the scanner 2. The light source 14 illuminates one portion of the disc indicated at 16 and which may be calibrated in hundredths of the unit of measurement employed in spacing the series of light flux transmissive elements 5a. Since the signal supplied to the stroboscopic light source 14 has the same frequency as the scanning rate during such times that the scanner and meter ribbon are stationary relative to one another, the pulse light from the light source will optically stop the disc and illuminate the same portion of the disc at a frequency corresponding to the frequency generated. However, when the signal to the stroboscopic light source 14 undergoes a phase change which results from the aforementioned bodily relative displacement, the light will fire at a different time and thus illuminate a different portion of the indicating disc. This gives a different reading.

A second light shield 19 is positioned over the series 3 and 4. The light shield 19 includes a light aperture in the form of a slot 20 positioned transversely of the member 1 and over the series 3, and a second slot 21 positioned over the series 4. Light source 22 and 23 project light through lenses 24 and 25 positioned beneath these slots, through the transparent convolutions of the spiral and to photocells 26 and 27 respectively. Lenses 28 and 29 may be positioned between the shield 19 and the photocells 26 and 27 so as to focus light on the photocells 26 and 27. The convolutions of the spiral of the scanner serve to modulate the light flux transmitted through the series 3 and 4 in a manner similar to the scanning action over the series 5. The scanning action is, in this instance however, transversely of the meter bar 1 and if the scanning disc 2 is rotated in a counterclockwise direction as seen in FIGURE 3, the scanning action will take place radially inwardly and transversely of the meter bar in FIGURE 3.

The series of flux conductive areas 3 are given a gradual slope with respect to the longitudinal axis of the member 1. Preferably they are given a slope of one pitch measured transversely of the member 1 for every ten inches of length of the member. The series 4, on the other hand, has a slope equal to one pitch for every one inch length of the member 1. Thus the distance between center lines of the areas in the series 3 and 4, measured longitudinally of the member 1, is equal to multiples of the units of measurement employed with the series 5.

When the scanner 2 is rotated at the given speed, for example, 60 revolutions per second, the signals generated by the photocells 26 and 27 will be 60 cycles per second. Then, if the scanner 2 and member 1 are given a relative bodily movement from left to right or from right to left in FIGURE 3, the areas of the series 3 and the areas of the series 4 will appear to move transversely under the slots 20 and 21 and will move apparently in a direction according to the direction of such relative movement. In the case of the series 3, a ten-inch relative bodily displacement is necessary to cause a displacement of the areas (parallel to the direction of scanning) equal to one pitch and this will bring about a 360 degree phase change in the signal transmitted by the photocell 26. In the case of the series 4, a one-inch relative bodily displacement between the scanner 2 and member 1 causes a displacement of one pitch and this will bring about a 360 degree phase change in the signal generated and transmitted through the photocell 27. In the event of a lesser displacement, the phase change transmitted by the photocells 26 and 27 is proportionately lesser.

The signal generated and transmitted through the photocell 27 is amplified as at 30 and supplied to a stroboscopic light source 21 which is employed to illuminate a portion 32 on the disc 16. The signal generated and transmitted by the photocell 26 is amplified as at 33 and supplied to a third stroboscopic light source 34 which serves to illuminate a third indicating portion 35 carried by the disc 16.

Each of the portions 15a, 32 and 35 carry calibrations spaced in circles about the axis of the disc 16. The 360 degrees of calibrations in the portions 15a, 32 and 35 are equivalent to one tenth of an inch, one inch and ten inches respectively.

Since the series 3 in the C channel or track requires a ten-inch longitudinal displacement to bring about a 360 degree phase change, the portion 35 may be calibrated in inches from zero to ten with ten zeroes, ten ones, ten twos, etc., as shown. Since the series 4 in the M channel or track requires a one-inch displacement to bring about a 360 degree phase change, the portion 32 may be calibrated in tenths of an inch from zero to ten with ten zeros, ten ones, ten twos, etc., as shown.

Thus the signal generating elements formed by the scanner 2 and member 1 cooperate to bring about a phase change in a cyclic signal which is precisely proportional to the displacement of the member 1 relative to the scanner 2. Under some circumstances, it may be desirable to maintain the element or member 1 in a static position. The phase change is then effected by bodily moving the scanning assembly comprised of the scanner 2 and motor 12. A predetermined phase change, as for example 360 electrical degrees, in each of the signals generated a equivalent to a predetermined unit of measurement or a predetermined multiple or submultiple of the unit of measurement.

An oscilloscope may also under certain conditions be used in the various forms of the invention to not only translate variable phase relationships (existing between alternating currents which are proportional to linear displacements) into visual indications of the magnitude of longitudinal displacements, but it can also be utilized to graph such magnitudes on a chart for permanent recording. Methods and means for accomplishing this result are divulged in my U.S. Patent No. 2,628,539 issued February 17, 1953.

The use of flux interrupting members having only one single multi convolution spiral has been described and illustrated herein. However, it will be understood that double, triple, quadruple or even larger number of spirals can be used, if desired. It will be understood that the systems herein described can be adapted to measure linear displacements in units of linear measurement of the metric system (or any other system) if desired. In that case, the pitch of the spiral flux interrupting members and the pitch of flux transmissive, non-transmissive elements arranged along the length of the meter bar would be, for instance, 1 centimeter, or 1 millimeter, etc.

In the production of meter bars and their coacting rotary flux interrupters, it will be found that errors in the spacing, profiles or outlines of alternate flux transmissive and non-transmissive elements impressed thereon can be reduced almost to the vanishing point by causing a large number of rotated, flux transmitting spiral convolutions to cooperate simultaneously with a similar number of alternate flux transmissive and non-transmissive elements arranged along the length of a meter bar to effect modulation of the flux.

It will be understood that the methods and means described and illustrated in the instant disclosure can be utilized in many different types of measuring devices such as inside and outside micrometers, depth micrometers, thread gauges, bench inspection gauges, height gauges, etc. It will also be understood that the seystem herein disclosed are also suitable for measuring and visaully indicating the linear movement of various measuring elements which are displaced in response to physical changes such as pressure, temperature, and density. Thus, as an example, changes in the length of a metallic bellows in response to changes in pressure of a gas could be very accurately measured and then visually indicated at a point remote from the bellows.

In the specification, the principles of the invention and the best mode in which it is contemplated applying those principles has been explained, so as to distinguish this invention from other inventions; and the part, improvement or combination which is claimed as the invention or discovery has been particularly pointed out and distinctly claimed.

In the specification and claim, on occasion, the term "lineal" or "lineally extending member" or words of this type have been used to describe or refer to the meter bar. But it should be understood that it might be circular or annular or in the form of a disc with the track or tracks continuous or disconnected arcs. Accordingly, in the claims the terms "lineal," lineally," "longitudinal" and the like should be interpreted to describe and cover a curved as well as a rectilinear track. Also, while a spiral has been shown in all forms and described, it might be a helix on a cylindrical drum, and the claims should be interpreted accordingly.

While certain preferred embodiments of the invention have been shown and described, it will be understood that modifications and changes may be made without departing from the spirit and scope thereof, as will be clear to those skilled in the art.

What is claimed is:

A light flux interrupter comprising a rotatable disc, a multiple convolution light flux transmissive helix of constant pitch on said disc, means for continuously rotating the disc, a longitudinally extending meter bar having light interrupting elements adjacent the edge thereof, means for supporting the meter bar immediately adjacent to the helix in such a manner that the axis of the meter bar is in parallelism with the direction of linear displacement of the helix, a shield member between said disc and said meter bar, said shield member having a slit whose long dimension is along a radius of said disc, said slit being aligned with said light interrupting elements, a light source projecting light flux through the helix and said light interrupting elements whereby the light flux is modulated in response to relative movement between the helix and the light interrupting elements on the meter bar.

References Cited by the Examiner

UNITED STATES PATENTS

| | | | |
|---|---|---|---|
| 1,693,227 | 11/1928 | Ellis | 33—111 |
| 2,016,985 | 10/1935 | Carlson | 33—111 |
| 2,113,411 | 4/1938 | Schiller | 178—7.6 |
| 2,184,525 | 12/1939 | Ives | 178—7.6 |
| 2,589,421 | 3/1952 | Morrison | 88—61 |
| 2,813,460 | 11/1957 | Wallin | 88—61 |
| 2,886,717 | 5/1959 | Williamson et al. | 88—14 |

FOREIGN PATENTS

| | | |
|---|---|---|
| 814,020 | 3/1937 | France. |
| 782,831 | 9/1957 | Great Britain. |

JEWELL H. PEDERSEN, *Primary Examiner.*